United States Patent [19]

Hong

[11] Patent Number: 4,629,743
[45] Date of Patent: Dec. 16, 1986

[54] PROCESS FOR PREPARING HIGH BULK DENSITY VINYL RESINS

[75] Inventor: Paul O. Hong, King of Prussia, Pa.

[73] Assignee: The B.F. Goodrich Company, Akron, Ohio

[21] Appl. No.: 848,191

[22] Filed: Apr. 4, 1986

Related U.S. Application Data

[62] Division of Ser. No. 736,161, May 20, 1985, Pat. No. 4,607,058.

[51] Int. Cl.$^4$ ............................................. C08J 9/22
[52] U.S. Cl. .................................. 521/57; 521/56; 521/60; 521/84.1; 521/145; 524/43; 526/200; 428/407
[58] Field of Search .................... 526/200; 521/56, 57, 521/145, 84; 524/43; 428/407

[56] References Cited

U.S. PATENT DOCUMENTS

| | | | |
|---|---|---|---|
| 3,879,365 | 4/1975 | Gremminger et al. | 526/200 |
| 3,917,548 | 11/1975 | Harrington | 526/200 |
| 4,093,788 | 6/1978 | Jin et al. | 526/74 |
| 4,143,224 | 3/1979 | Klipper et al. | 526/200 |
| 4,206,298 | 6/1980 | Reichert et al. | 526/200 |
| 4,208,499 | 6/1980 | Marahashi et al. | 526/200 |
| 4,228,264 | 10/1980 | Yamamoto et al. | 526/200 |
| 4,294,945 | 10/1981 | Wei | 526/200 |
| 4,525,559 | 6/1985 | Seilfeld et al. | 526/200 |

*Primary Examiner*—Morton Foelak
*Attorney, Agent, or Firm*—Joe A. Powell; Alan A. Csontos

[57] ABSTRACT

Spherical particles of vinyl resins having high bulk density can be prepared by the suspension polymerization process by using as a dispersant an alkyl hydroxy cellulose having a viscosity of from about 1000 to about 100,000 cps. A suitable dispersant is a hydroxypropyl methyl cellulose polymer having the formula:

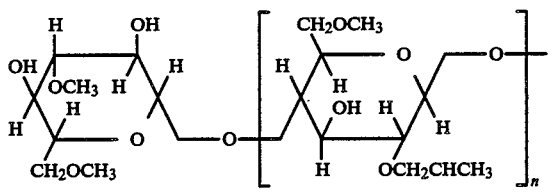

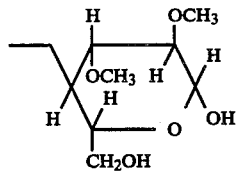

where n is from about 300 to about 1500.

3 Claims, No Drawings

PROCESS FOR PREPARING HIGH BULK DENSITY VINYL RESINS

This is a division of application Ser. No. 736,161 filed May 20, 1985, now U.S. Pat. No. 4,607,058.

BACKGROUND OF THE INVENTION

Many polymerizable monomeric materials, and particularly vinyl chloride, are being polymerized today on a large scale commercially either in suspension media or in aqueous dispersion or emulsion, i.e., latex form, employing various colloidal suspension agents, emulsifiers or soaps, or synthetic detergent type dispersing agents. In these methods of polymerization, and particularly in suspension polymerization, vigorous agitation is depended upon to suspend and disperse the monomer particles or droplets throughout the reaction media and to maintain such suspension or dispersion during the polymerization reaction and to assist in heat transfer to the reactor cooling surfaces. However, in most instances, polymer particles produced in accordance with these processes are not spherical in shape. Small particles tend to agglomerate into irregular shaped particles. These irregular shaped particles result in a resin with a low bulk density. High bulk density is a desirable polymer property because it gives faster extrusion rates, easier handling and shipping advantages.

Heretofore it has been suggested to use an excess of soap in the reaction medium to overcome agglomeration. This does prevent agglomeration, however, the polymer particles are very small and spherical in shape. Small particles have other processing disadvantages.

It is desirable to produce a polymer having large particle size and the particles be spherical in shape thus giving a high bulk density resin.

SUMMARY OF THE INVENTION

It has unexpectedly been found that high bulk density vinyl resins, having substantially spherical particles can be prepared by the suspension polymerization process by employing as a dispersant a non-ionic, high molecular weight alkyl hydroxy cellulose polymer, preferred is a hydroxypropyl methyl cellulose polymer having the formula:

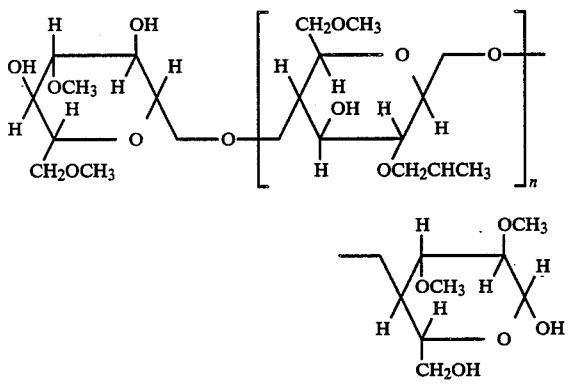

where n is from about 300 to about 1500.

Suitable polymer dispersants have a molecular weight of from about 50,000 to about 500,000. The dispersant should also have a viscosity range of from about 1000 to about 100,000 cps as measured as 2% in water at 20° C. according to ASTM D 2363.

DETAILED DESCRIPTION

While the present invention is specifically illustrated hereinafter with regard to the suspension polymerization of vinyl chloride, it is to be understood that this is merely for purposes of illustration and convenience since the present process may likewise be employed in the suspension polymerization of any polymerizable ethylenically unsaturated monomer or monomers.

The monomers which may be employed in the present invention include vinyl chloride and polymerizable olefinic monomers copolymerizable therewith having at least one terminal $CH_2=C<$ grouping such as the other vinyl halides and vinylidene halides, for example, vinyl bromide, vinylidene chloride, etc.; acrylic acid; esters of acrylic acid, such as methyl acrylate, ethyl acrylate, butyl acrylate, octyl acrylate, cyanoethyl acrylate, and the like; methacrylic acid; esters of methacrylic acid, such as methyl methacrylate, butyl methacrylate, and the like; nitriles, such as acrylonitrile, methacrylonitrile, etc.; acrylamides, such as methyl acrylamide, N-methylol acrylamide, N-butoxy methacrylamide, and the like; vinyl ethers, such as ethyl vinyl ether, chloroethyl vinyl ether, and the like; the vinyl ketones, such as methyl vinyl ketone, etc.; vinyl naphthalene; allyl and vinyl chloroacetate; vinyl acetate; vinyl pyridine; and mixtures of any of these types of monomers and other olefinic monomers copolymerizable therewith including esters of maleic and fumaric acid, and the like; and other copolymerizable olefinic monomers of the types known to those skilled in the art.

The present invention is particularly applicable to the polymerization of vinyl chloride, either alone, or in admixture with one or more other polymerizable olefinic monomers having at least one terminal $CH_2=C<$ grouping in amounts up to about 50% preferably up to about 20%, weight of comonomer, based on the weight of the monomer mixture.

The most important and salient feature of the present invention is the colloidal stabilization, or dispersant system, that is employed in the polymerization reaction for the purpose of stabilizing the dispersed monomer droplets against coalescence. It has quite unexpectedly been found that spherical polymer particles having high bulk density can be prepared when using as a component of the dispersant system at least one dispersant that is a non-ionic high molecular weight alkyl hydroxy cellulose polymer. Preferred is a hydroxypropyl methyl cellulose polymer. Suitable polymers have a molecular weight of from about 50,000 to about 500,000, preferably from about 75,000 to about 150,000, with a chain length of from about 300 to about 1500 repeating units, preferably from about 400 to about 700. The polymer should also have a viscosity range of from about 1000 to about 100,000 cps, preferably from about 2000 to 10,000 cps, as measured by a 2% solution in water at 20° C. according to ASTM D 2363. Polymers such as these are normally identified by their viscosity rather than molecular weight. Viscosity is the important characteristic for operation in this invention. Wherever viscosity is expressed in this specification it is arrived at by measuring as a 2% solution in water at 20° C. according to ASTM D 2363.

A suitable non-ionic, high molecular weight polymer for use as a dispersant in this invention is hydroxypropyl methyl cellulose having the following formula:

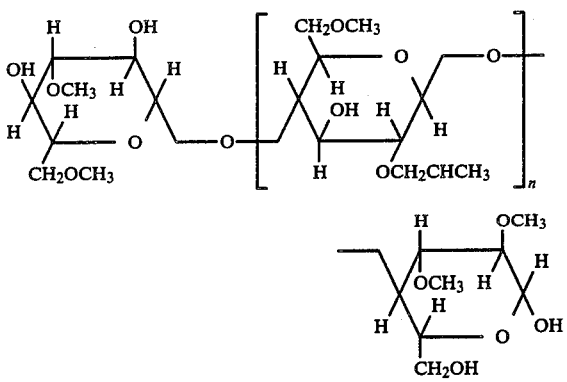

where n is from about 300 to about 1500.

The chain length of the dispersant is very important for this invention. If the chain length is longer than the recommended length, then the aqueous medium cannot be properly agitated during polymerization because the aqueous medium (water) is thickened excessively. If the chain length is shorter than the recommended length, then the droplets of suspended vinyl monomer have a tendency to agglomerate, thereby reducing bulk density.

Dispersants of this invention may be readily obtained from the Dow Chemical Company. They are sold under the trade name of Methocel. Lower viscosity materials are also sold under the same trade name but they do not work to make spherical shape, high bulk density resins.

The level of non-ionic, high molecular weight polymer dispersant used in this invention is in the range of about 0.01 to about 1.0, preferably 0.02 to 0.10, part by weight per 100 parts by weight of polymerizable monomer to give satisfactory results. Different viscosity hydroxypropyl methyl cellulose dispersants within this invention (1,000 to 100,000 cps) will require different levels to get optimum results. For example, higher viscosities such as 75,000 cps will require slightly higher levels than a 4,000 cps material. Optimizing the recipe is well within the skill of those in the art. More than one hydroxypropyl methyl cellulose dispersant may be used in combination.

In the process of this invention other surfactants may be employed, along with the high molecular weight hydroxypropyl methyl cellulose dispersant. Among the surfactants that are satisfactory, include the water-soluble, polyether containing nonionic surfactants. Examples of polyether containing nonionic surfactants useful are those falling within the following generic classes: (1) polyoxyethylene alkylphenols; (2) polyoxyethylene alcohols; (3) polyoxyethylene esters of fatty acids; (4) polyoxyethylene alkylamines; and (5) polyoxyethylene alkylamides. As examples of surfactants in the above-named classes there may be named the following: polyoxyethylene (20) sorbitan monooleate, polyoxyethylene (20) sorbitan monolaurate, polyoxyethyene (20) sorbitan monopalmitate, polyoxyethylene (20) sorbitan monostearate, polyoxyethylene (40) stearate, polyoxyethylene (50) stearate, polyoxyethylene esters of mixed fatty and resin acids, polyoxyethylene (20) palmitate, polyethylene glycol monolaurate, polyethylene glycol monooleate, polyethylene glycol ricinoleate, polyethylene glycol monostearate, polyethylene glycol distearate, polyoxyethylene (25) stearate, polyoxyethylene (40) stearate, polyoxyethylene (25) castor oil, polyoxyethylene (52) castor oil, polyoxyethylene (9) laurate, polyoxyethylene (15) tallate, polyoxyethylene (9) lauryl ether, polyoxyethylene (12) lauryl ether, polyoxyethylene (23) lauryl ether, polyoxyethylene (6) tridecyl ether, polyoxyethylene (10) tridecyl ether, polyoxyethylene (10) oleyl ether, polyoxyethylene (20) oleyl ether, polyoxyethylene (50) oleyl ether, polyoxyethylene (15) cetyl stearyl ether, polyoxyethylene (20) stearyl ether, polyoxyethylene (30) stearyl ether, polyoxyethylene (8) tridecyl ether, polyoxyethylene (9) nonyl phenyl ether, polyoxyethylene (21) coconut ester, and the like, etc. The above compounds have a multiplicity of functional groups and accordingly a very large number of modifications is possible. Mixtures of said compounds can also be used.

Non-polyethylene oxide containing surfactants as taught in U.S. Pat. No. 4,435,524, may be used together with a polyethylene oxide containing surfactant and the high molecular weight hydroxypropyl methyl cellulose dispersant. Suitable non-polyethylene oxide containing surfactants are those compounds from the sorbitan ester family or the glycerol ester or polyglycerol ester families, as well as the polyvinyl alcohols, which do not contain polyethylene oxide segments. As examples of such surfactants there may be named sorbitan trioleate, sorbitan tri-stearate, sorbitan monooleate, sorbitan monopalmitate, glycerol monooleate, glycerol monostearate, triglycerol monooleate, 72.5% hydrolyzed polyvinyl acetate, and the like.

The polyethylene-oxide containing surfactant may be used at a level of from about 0.005 parts by weight to about 1.0 parts by weight per 100 parts by weight of monomer. Preferably, an amount of about 0.0075 parts by weight to about 0.5 parts by weight per 100 parts by weight of monomer is used. The non-polyethylene oxide containing surfactant may be used at a level of from about 0.005 parts by weight to about 0.2 parts by weight per 100 parts by weight of monomer, preferably from about 0.02 parts by weight to about 0.1 parts by weight per 100 parts by weight of monomer.

Any of the well known dispersants operative in aqueous media may be employed. These include among others, methyl cellulose, low molecular weight hydroxypropyl methyl cellulose, polyvinyl alcohol, lauryl alcohol, sorbitan monolaurate polyoxyethylene, nonylphenoxy polyoxyethylene ethanol, hydrolyzed polyvinyl acetates, and the like.

In the suspension process, the monomer droplet is formed and is coated or surrounded by the dispersant. The individual monomer droplets are maintained in the suspension and do not agglomerate. The coating of dispersant becomes a part of the outside surface of the particles in the finished state. An analysis of the resin particle surface may be made by ESCA techniques to show that the dispersant is on the surface of the polymerized resin particle.

Among the catalysts or initiators that may be employed in the present invention are the free radical yielding catalysts or initiators, such as the alkanoyl, aroyl, alkaroyl and aralkanoyl diperoxides and monohydroperoxides, azo compounds, peroxyesters, percarbonates, and the like. As examples of such catalysts, there may be named benzoyl diperoxide, lauryl diperoxide, diacetyl peroxide, cumene hydroperoxides, methyl ethyl ketone peroxide, diisopropylbenzene hydroperoxide, 2,4-dichlorobenzoyl peroxide, benzoyl peroxide, naphthoyl peroxide, lauroyl peroxide, acetyl cyclohexane sulfonyl peroxide, t-butyl perbenzoate, di-t-butyl perphthalate, diisopropyl peroxydicarbonate, 2-ethyl hexyl peroxydicarbonate, di(sec-butyl)peroxydicarbonate and the like, azo-bisisobutyronitrile, α,α'-azodiisobutyrate, and the like. The choice of any particular free radical yielding catalyst is dictated in part by the particular monomer or monomers to be polymerized and by the color requirements of the polymer or copolymer to be produced. Further, more than one catalyst may be employed in the polymerization recipe. Usually the amount of catalyst or catalysts employed will be in the range of about 0.005% to about 1.0% by weight, based on the weight of the monomer or monomers being polymerized. Preferably, the amount of catalyst(s) will be in the range of about 0.02% to about 0.10% by weight.

In aqueous suspension polymerization the reaction is usually conducted at a temperature in the range of about 0° C. to about 100° C. depending upon the particular monomer or monomers being polymerized. It is preferred, however, to employ temperatures in the range of about 40° C. to about 70° C., since, at these temperatures, polymers having the most all around beneficial properties are produced. This is particularly so in the case of making homopolymers and copolymers of vinyl chloride. The time of the reaction will vary from about 2 to about 15 hours.

The suspension polymerization process may be carried out at autogenous pressures although superatmospheric pressures of up to 10 atmospheres or more may be employed with some advantage with the more volatile monomers.

In the suspension polymerization procedure, the various ingredients are thoroughly mixed prior to the start of the reaction. That is, the aqueous medium, preferably distilled water, the monomer to be polymerized, such as vinyl chloride, the non-ionic, high molecular weight polymer dispersant, other optional dispersants or surfactant, and an oil-soluble catalyst are all mixed together at a temperature below that at which the particular catalyst being used becomes active. While this mixing can be done in a vessel apart from the reaction vessel, for convenience and practical reasons the mixing of the ingredients is done in the polymerization reaction vessel under an inert atmosphere, particularly where the monomer or monomers being employed are subject to oxidation.

In the suspension polymerization process of this invention, agitation or stirring of the reaction medium is necessary during the entire polymerization reaction period, that is, from 0% conversion to completion of the reaction. Prior to the start of the polymerization reaction, the polymerization mixture is agitated to provide shear action to disperse or suspend the monomer(s) in the reaction medium in the form of droplets. These droplets should be of such size that when transformed into polymer particles, which are spherical, the same will be of the desired size. The polymer particles produced in accordance with this invention should have a diameter in the range of about 30 microns to about 1000 microns. Preferably, for most end uses, the polymer particles will have a diameter in the range of about 50 microns to about 500 microns.

Various means, known to those in the art, may be employed to get and maintain the proper agitation and shearing action. The reaction vessel or polymerizer is made of stainless steel or glass lined and fitted with a heating and cooling jacket and having a rotatable shaft mounted centrally thereof. On said shaft are mounted one or more agitator blades, which may be flat or curved. Further, one or more baffles are employed which are mounted on the inner wall of the reactor or adjacent thereto. The baffles give an up and down, pumping action to the reaction medium in addition to the circular motion thereof created by the agitator blades.

The amount of agitation desired or necessary to obtain the desired results will vary depending upon the particular monomer or monomers being polymerized, as well as the particular polymer particle size desired in the end product. This means that the agitation speed of the rotatable shaft carrying the agitator blades must be regulated within certain limits. There are many variables involved in obtaining the optimum conditions for any particular polymerization recipe, such as, for example, the size of the reactor, the number of blades on the rotatable shaft as well as the shape thereof, which will dictate the agitation speed to be employed in obtaining the desired particle size of the polymer particles. It is to be noted that as the reactor capacity is increased or decreased, adjustment in the length, width and pitch of the blades must be made in order to achieve the desired agitation and shear action. It should also be noted that the agitation and shear action will be influenced by the monomer(s) being polymerized and the temperature of the polymerization reaction. It is well known to those skilled in the art of polymerization how to make the changes in agitation to accomplish the desired affects on a particular polymerization run.

While the present invention may utilize any of the conventional suspension polymerization techniques, it is possible to utilize a full reactor technique, particularly for reducing chances of polymer buildup in the reactor. By full reactor technique is meant that the reaction vessel is completely filled with the polymerization medium at the start of the reaction and kept that way throughout the entire period of the reaction by the continuous addition thereto of additional reaction medium ingredients of which are in the same proportion as the startup. Upon the addition of a certain predetermined amount of aqueous polymerization medium, the polymerization reaction is terminated, usually by the addition thereto of a shortstopping agent or by rapid cooling. The necessity for the addition of aqueous polymerization medium is due to the shrinkage in volume of the reaction medium produced by the conversion of the monomer or monomers to the polymeric state.

The resin particles produced by this invention are spherical in shape. Spherical particles offer advantages over non spherical resin particles. Fast extrusion rates and low shipping costs are but two of the many advantages gained by using spherical particles.

A very good method to measure the spherical shape of resins is to determine the shape factor by optical procedures. The image of the particle is projected onto a flat surface to provide a two dimensional view. The shape factor of a particle is determined by inscribing and circumscribing the resin particles flat image with a circle. The ratio of the diameters of the inscribed circle to the circumscribed circle is the number known as the shape factor.

In the case of a perfect circle, the inscribed and circumscribed circles would have the same diameter and, therefore, the shape factor would be unity (1.0). The more near the shape factor is to 1.0 the more spherical the particle.

Commercial polyvinyl chloride resin particles typically have a shape factor ranging from about 0.7 to about 0.88. The shape factor of the resin particles of this invention is greater than about 0.9, preferably greater than about 0.93, and more preferably greater than about 0.95.

The preferred optical procedure used to determine the shape factor is to first screen the particles through a 105 micron screen and run the test on the particles larger than 105 microns. Static interference can also affect this optical procedure. Particles could be stuck together by static and appear to be agglomerated when in fact they are separate particles. By measuring the particles greater than 105 microns, the static problems are reduced. For smaller particles, static can be reduced by first mixing the resin particles with an organic non-solvent such as ethanol or methanol, evaporating the solvent and then using the optical procedure. 45×optical photomicrographs are prepared that can provide for a count of at least 400 particles for each sample. Using a Zeiss TGZ-3 Particle Analyzer, count the required number of particles by setting the counting aperture at the maximum diameter of the particle. This would form the circumscribed circle. Repeat the count on the same particles but use the minimum diameter of the aperture that will describe the minimum diameter of the particle. This would form the inscribed circle. The shape factor of the resin sample is determined by adding together the diameters of all the inscribed circles and dividing that number by the sum of all the circumscribed diameters. The shape factor for the resin represents an average of the particles in the sample.

Resin having particles with a high shape factor will have a higher bulk density than resin having particles with a lower shape factor assuming constant porosity and particle size. Very simply, spherical objects pack more tightly than do irregular objects. The resins of this invention preferably have a bulk density greater than 0.58 g/cc with the more preferred bulk density being greater than 0.62 g/cc, when used in rigid applications such as pipe and siding. For resins used in flexible applications, the bulk density is preferably greater than 0.50 g/cc. The lower bulk density for flexible applications resin is due to the higher porosity. The increased bulk density of spherical resins over non spherical resin results in increased shipping and storage efficiency, that is more weight of resin can be stored or shipped in a given container volume. Also, with other factors being constant, the increased bulk density and spherical shape result in increased extruder output, meaning more end product such as pipe can be produced on a given piece of extrusion equipment.

To further illustrate the present invention, the following specific examples are given, it being understood that this is merely intended in an illustrative and not a limitative sense. In the examples all parts and percents are by weight unless otherwise indicated.

EXAMPLE 1

This Example is presented to illustrate that a hydroxypropyl methyl cellulose having a viscosity of 4000 cps produces spherical particles having higher bulk density, while hydroxypropyl methyl cellulose having viscosities of 50 cps and 100 cps produce lower bulk densities. The polymerization recipe employed was as follows:

TABLE I

| Ingredient | Parts by Weight | | |
|---|---|---|---|
| | Run 1 | Run 2 | Run 3 |
| Vinyl chloride monomer | 100 | 100 | 100 |
| Water (demineralized) | 152 | 152 | 152 |
| Peroxydicarbonate catalyst | 0.0450 | 0.0450 | 0.0450 |
| Bisphenol-A | 0.0400 | 0.0400 | 0.0400 |
| Polyethylene oxide containing surfactant | 0.0200 | 0.0200 | 0.0200 |
| Polyvinyl Alcohol surfactant | 0.0100 | 0.0100 | 0.0100 |
| Hydroxypropyl methyl cellulose | | | |
| viscosity 50 cps | 0.0400 | — | — |
| viscosity 100 cps | — | 0.0400 | — |
| viscosity 4000 cps | — | — | 0.0400 |

In this example, a three-liter stainless steel reactor, equipped with agitation was employed. The water, dispersants, surfactants and catalysts were added to the reaction and agitated at 700 rpm. The vinyl chloride was then added and the contents heated to 57° C. During the course of the reaction, water was continuously added to the reactor to compensate for the shrinkage in volume due to the conversion of monomer to polymer. When the reaction was complete, further polymerization was stopped by the addition of bisphenol A shortstop. The contents of the reactor were emptied and the polymer recovered in the usual manner. The polymer was tested and the results are given in Table II. Average particle size was determined according to ASTM D 1705. DOP porosity was determined according to ASTM D 3367-75. Apparent bulk density and funnel flow time were determined according to ASTM D 1895.

TABLE II

| Test | Resin | | |
|---|---|---|---|
| | Run 1 | Run 2 | Run 3 |
| Avg. particle size (micron) | 136.3 | 111.1 | 128.8 |
| DOP Porosity (cc/g) | 0.159 | 0.186 | 0.132 |
| Apparent bulk density (g/cc) | 0.530 | 0.530 | 0.565 |
| Funnel Flow Time (sec.) | 16.7 | 19.7 | 18.3 |

From the above data, it can be seen that this invention (Run 3) produces a resin having higher bulk density (0.565) than the resins of Runs 1 and 2 (0.530) which were made with a hydroxypropyl methyl cellulose having viscosities of 50 cps and 100 cps respectively. The hydroxypropyl methyl cellulose with a viscosity of 4000 cps (Run 3) gave a higher bulk density. Runs 1 and 2 are outside this invention whereas Run 3 is within this invention.

EXAMPLE 2

This Example is presented to demonstrate that when the level of the high viscosity hydroxypropyl methyl cellulose of this invention is increased, there is further improvement in the bulk density. The reaction was run following the same procedures and conditions of Example 1 except that the amount of hydroxypropyl methyl cellulose was increased. The recipe used was as shown in Table III.

TABLE III

| Ingredient | Parts by Weight | |
| --- | --- | --- |
| | Run 4 | Run 5 |
| Vinyl chloride monomer | 100 | 100 |
| Water (demineralized) | 152 | 152 |
| Peroxydicarbonate catalyst | 0.0450 | 0.0450 |
| Bisphenol A | 0.0400 | 0.0400 |
| Polyethylene oxide containing surfactant | 0.0200 | 0.0200 |
| Polyvinyl alcohol surfactant | 0.0100 | 0.0100 |
| Hydroxypropyl methyl cellulose | | |
| viscosity 50 cps | 0.0800 | — |
| viscosity 4000 cps | — | 0.0800 |

The data from Runs 4 and 5 are shown in Table IV.

TABLE IV

| Test | Resin | |
| --- | --- | --- |
| | Run 4 | Run 5 |
| Avg. particle size (micron) | 103.2 | 201.9 |
| DOP Porosity (cc/g) | 0.164 | 0.063 |
| Apparent bulk density (g/cc) | 0.489 | 0.753 |
| Funnel Flow Time (sec.) | 28.1 | 13.2 |

The above data of Table IV show that the bulk density is much higher in Run 5 where the high viscosity (4000 cps) hydroxypropyl methyl cellulose was used compared with the same recipe having the lower viscosity (Run 4) material.

EXAMPLE 3

This Example is presented to show that high viscosity (75,000 cps) hydroxypropyl methyl cellulose will make spherical particle resin having high bulk density. As can be seen from Runs 6 and 7 below, it is preferred to use a higher amount of the novel dispersant as the viscosity of the novel dispersant increases. The reaction was run following the same procedures and conditions as in Example 1 except for the type and amount of hydroxypropyl methyl cellulose. The recipe used is as shown in Table V.

TABLE V

| Ingredient | Parts by Weight | |
| --- | --- | --- |
| | Run 6 | Run 7 |
| Vinyl chloride monomer | 100 | 100 |
| Water (demineralized) | 152 | 152 |
| Peroxydicarbonate catalyst | 0.0450 | 0.0450 |
| Bisphenol A | 0.0400 | 0.0400 |
| Polyethylene oxide containing surfactant | 0.0200 | 0.0200 |
| Polyvinyl alcohol surfactant | 0.0100 | 0.0100 |
| Hydroxypropyl methyl cellulose viscosity 75,000 cps | 0.0400 | 0.0800 |

The data from Runs 6 and 7 are shown in Table VI.

TABLE VI

| Test | Resin | |
| --- | --- | --- |
| | Run 6 | Run 7 |
| Avg. particle size (micron) | 127.0 | 125.8 |
| DOP Porosity (cc/g) | 0.107 | 0.088 |
| Apparent bulk density (g/cc) | 0.510 | 0.634 |
| Funnel Flow Time (sec.) | 21.5 | 15.5 |

From the above data it can be seen that the 75,000 cps viscosity hydroxypropyl methyl cellulose requires a higher concentration than does the 4000 cps viscosity material, however, it does work very well in giving a high bulk density resin.

EXAMPLE 4

This Example is presented to show that the high viscosity hydroxypropyl methyl cellulose of this invention may be used alone as the only dispersant to produce a high bulk density spherical resin. The reaction was run the same as in Example 1. The recipe used was as follows:

TABLE VII

| Ingredient | Parts by Weight Run 8 |
| --- | --- |
| Vinyl chloride monomer | 100 |
| Water (demineralized) | 152 |
| Peroxydicarbonate catalyst | 0.0450 |
| Bisphenol A | 0.0400 |
| Polyethylene oxide containing surfactant | 0.0200 |
| Polyvinyl alcohol surfactant | 0.0100 |
| Hydroxypropyl methyl cellulose viscosity 4000 cps | 0.0600 |

The properties of the resin produced in Run 8 are shown in Table VIII.

TABLE VIII

| Test | Run 8 Resin |
| --- | --- |
| Avg. particle size (micron) | 179.8 |
| DOP Porosity (cc/g) | 0.066 |
| Apparent bulk density (g/cc) | 0.695 |
| Funnel Flow Time (sec.) | 15.7 |

The results shown by Examples 1 through 4 are very surprising in that the viscosity of the hydroxypropyl methyl cellulose makes a large difference in the final resin. The higher viscosity materials produce a spherical resin having high bulk density. The high viscosity hydroxypropyl methyl cellulose can even be used as the only dispersant and produce a spherical, high bulk density resin.

The resins produced according to this invention are spherical in shape as evidenced by their having a high shape factor (greater than 0.9).

The resins produced by this invention have many uses. They may be formulated with plasticizers, lubricants, stabilizers and impact modifiers and extruded into pipe, house siding, window frames and the like.

While the present invention has been described in terms of its specific embodiments, certain modifications and equivalents will be apparent to those skilled in the art and are intended to be included within the scope of the present invention, which is to be limited only by the scope of the appended claims.

I claim:

1. A porous spherical polyvinyl chloride resin in particulate form, obtained from by aqueous suspension polymerization and having a shape factor greater than about 0.9 wherein the outside surface of said resin particles consists of at least one hydroxypropyl methyl cellulose having a viscosity as measured as a 2% solution in water at 20° C. according to ASTM D 2363, of from about 4000 cps to about 75,000 cps, wherein said porous resin has a bulk density greater than about 0.58 g/cc and a DOP porosity greater than about 0.06 cc/g.

2. A spherical polyvinyl chloride resin of claim 1 wherein said alkyl hydroxy cellulose is a hydroxypropyl methyl cellulose polymer having the formula:

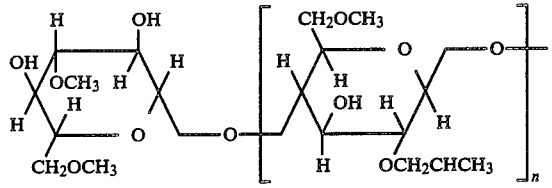
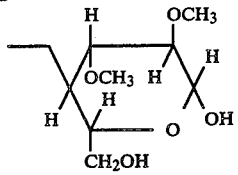
wherein n is from about 300 to about 1500 and wherein said dispersant has a molecular weight of from about 50,000 to about 500,000 and a viscosity of from about 4000 to about 75,000 cps as a 2% solution in water at 20° C. as measured by ASTM D 2363.
3. A resin of claim 2 in the fused state.
* * * * *